(12) United States Patent
Jarrier et al.

(10) Patent No.: US 9,358,488 B2
(45) Date of Patent: Jun. 7, 2016

(54) GAS TURBINE FILTRATION SYSTEM WITH INLET FILTER ORIENTATION ASSEMBLY

(71) Applicant: BHA Altair, LLC, Franklin, TN (US)

(72) Inventors: Etienne Rene Pascal Jarrier, Alton (GB); William Keith Eyers, Alton (GB); Peter John Duncan Smith, Alton (GB); Richard Paul Steele, Alton (GB)

(73) Assignee: BHA Altair, LLC, Franklin, TN (US)

( * ) Notice: Subject to any disclaimer, the term of this patent is extended or adjusted under 35 U.S.C. 154(b) by 0 days.

(21) Appl. No.: 14/080,831

(22) Filed: Nov. 15, 2013

(65) Prior Publication Data
US 2015/0135659 A1    May 21, 2015

(51) Int. Cl.
| | | |
|---|---|---|
| *B01D 46/00* | (2006.01) | |
| *B01D 46/12* | (2006.01) | |
| *B01D 46/02* | (2006.01) | |
| *B01D 46/52* | (2006.01) | |
| *F02M 35/024* | (2006.01) | |
| *F02C 7/055* | (2006.01) | |

(52) U.S. Cl.
CPC ........ *B01D 46/0005* (2013.01); *B01D 46/0002* (2013.01); *B01D 46/023* (2013.01); *B01D 46/125* (2013.01); *B01D 46/521* (2013.01); *F02C 7/055* (2013.01); *F02M 35/02416* (2013.01); *B01D 2265/026* (2013.01); *Y10T 29/49895* (2015.01)

(58) Field of Classification Search
CPC ............. B01D 46/0005; B01D 46/125; B01D 46/521; B01D 2265/026; B01D 46/0002; F02M 35/02416
See application file for complete search history.

(56) References Cited

U.S. PATENT DOCUMENTS

| | | |
|---|---|---|
| 7,722,699 B2 | 5/2010 | Morgan et al. |
| 8,216,413 B2 | 7/2012 | Langlands et al. |
| 8,372,181 B2 | 2/2013 | Davies |
| 2002/0121474 A1 | 9/2002 | Cullen |
| 2005/0039427 A1 | 2/2005 | Karlsson |
| 2010/0000190 A1* | 1/2010 | Kidman .................... 55/502 |
| 2010/0050873 A1 | 3/2010 | Hiner et al. |
| 2010/0054919 A1 | 3/2010 | Hiner et al. |
| 2010/0229514 A1 | 9/2010 | Ayshford et al. |
| 2010/0251681 A1 | 10/2010 | Gebert |
| 2011/0209622 A1 | 9/2011 | Hiner et al. |
| 2011/0290116 A1 | 12/2011 | Jarrier et al. |
| 2011/0315015 A1 | 12/2011 | Jarrier et al. |
| 2012/0000168 A1 | 1/2012 | Chaudhari et al. |

(Continued)

FOREIGN PATENT DOCUMENTS

| | | |
|---|---|---|
| EP | 1878873 A2 | 1/2008 |
| WO | 2011/000437 A1 | 1/2011 |

OTHER PUBLICATIONS

U.S. Appl. No. 14/058,320, filed Oct. 21, 2013, Smith, et al.

(Continued)

*Primary Examiner* — Robert Clemente
(74) *Attorney, Agent, or Firm* — Reinhart Boerner Van Deuren P.C.

(57) ABSTRACT

The present application provides a filtration system for a gas turbine engine. The filtration system may include a holding frame with a positioning element extending therefrom and a filtration unit for mounting within the holding frame. The filtration unit may include a positioning slot therein such that the positioning element extends through the positioning slot when the filtration unit is mounted within the holding frame.

15 Claims, 8 Drawing Sheets

(56) References Cited

U.S. PATENT DOCUMENTS

| | | |
|---|---|---|
| 2012/0000176 A1 | 1/2012 | Bryant et al. |
| 2012/0037005 A1 | 2/2012 | Jarrier et al. |
| 2012/0132075 A1 | 5/2012 | Jarrier et al. |
| 2012/0204525 A1 | 8/2012 | Jarrier |
| 2012/0204568 A1 | 8/2012 | Jarrier |
| 2012/0255268 A1 | 10/2012 | Nicholas et al. |
| 2012/0272632 A1 | 11/2012 | Lans |
| 2012/0317944 A1* | 12/2012 | Lise .............................. 55/499 |
| 2012/0324848 A1 | 12/2012 | Enbom |
| 2013/0000329 A1 | 1/2013 | Smith et al. |
| 2013/0011249 A1 | 1/2013 | Kippel et al. |
| 2013/0014479 A1 | 1/2013 | Mann et al. |
| 2013/0025245 A1 | 1/2013 | Healey |
| 2013/0074463 A1 | 3/2013 | Kulkarni et al. |
| 2013/0111859 A1 | 5/2013 | Bryant |
| 2013/0115114 A1 | 5/2013 | Bryant et al. |
| 2013/0189081 A1 | 7/2013 | Bryant et al. |
| 2013/0219844 A1 | 8/2013 | Sullivan |
| 2013/0232932 A1 | 9/2013 | Jarrier |
| 2013/0232934 A1* | 9/2013 | Baseotto ............ B01D 46/0086 55/502 |
| 2013/0255359 A1 | 10/2013 | Smith et al. |

OTHER PUBLICATIONS

U.S. Appl. No. 61/841,439, filed Jul. 1, 2013, Jarrier, et al.

* cited by examiner

GAS TURBINE FILTRATION SYSTEM WITH INLET FILTER ORIENTATION ASSEMBLY

TECHNICAL FIELD

The present application and the resultant patent relate generally to gas turbine engines and more particularly relate to a gas turbine filtration system with an inlet filter holding frame having a positioning assembly to ensure the correct orientation of the filters therein.

BACKGROUND OF THE INVENTION

Power generation equipment, such as a gas turbine engine and the like, generally uses a large supply of intake air to support the combustion process. Various types of inlet air filtration systems thus may be used upstream of the gas turbine compressor air inlet and elsewhere. Impure air laden with dust particles, salts, and other contaminants may cause damage to the compressor blades, other types of compressor components, and other components of the gas turbine engine in general. Contaminates may cause damage via corrosion, erosion, and the like. Such damage may reduce the life expectancy and performance of the compressor and also reduce the overall efficiency of the gas turbine engine. To avoid these problems, the inlet airflow generally passes through a series of filters and screens to assist in removing the contaminants before they reach the compressor or elsewhere.

Such filters may include "V cell" type, "mini-pleat" or bag filters and the like. These filters are generally square in configuration and may be installed in holding frames sized according to industry standards. The use of these square frames, however, may allow for the filters to be installed in the wrong orientation. Specifically, the filters may be installed with the pleats or pockets running in a horizontal orientation rather that a substantially vertical orientation that may promote good drainage. Moreover, unsuitable or unauthorized filters also may be used. Installing the filters in the wrong orientation or installing unsuitable filters could have a negative impact on overall gas turbine engine performance and efficiency.

There is thus a desire for an improved inlet air filtration system for use with a compressor and similar components of a gas turbine engine. Such an improved inlet air filtration system may accommodate V cell, mini-pleat, or bag filters and the like while ensuring that the filters are installed in the correct orientation for efficient operation and good sealing.

SUMMARY OF THE INVENTION

The present application and the resultant patent provide a filtration system for a gas turbine engine. The filtration system may include a holding frame with a positioning element extending therefrom and a filtration unit for mounting within the holding frame. The filtration unit may include a positioning slot therein such that the positioning element extends through the positioning slot when the filtration unit is mounted within the holding frame.

The present application and the resultant patent further provide a method of ensuring a correct orientation of a filtration unit within a holding frame of a filtration system. The method may include the steps of attaching a positioning element about the filtration unit, forming a positioning slot in the filtration unit such that the positioning slot is sized and positioned to accommodate the positioning element, mounting the filtration unit within the holding frame, and aligning the positioning slot and the positioning element so as to orient the filtration unit.

The present application and the resultant patent further provide a filtration system for a gas turbine engine. The filtration system may include a holding frame with a positioning rod extending therefrom and a square filter with an end cap for mounting within the holding frame. The end cap may include a positioning slot therein such that the positioning rod extends through the positioning slot when the square filter is mounted within the holding frame so as to ensure the correct installation of the square filter therein.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
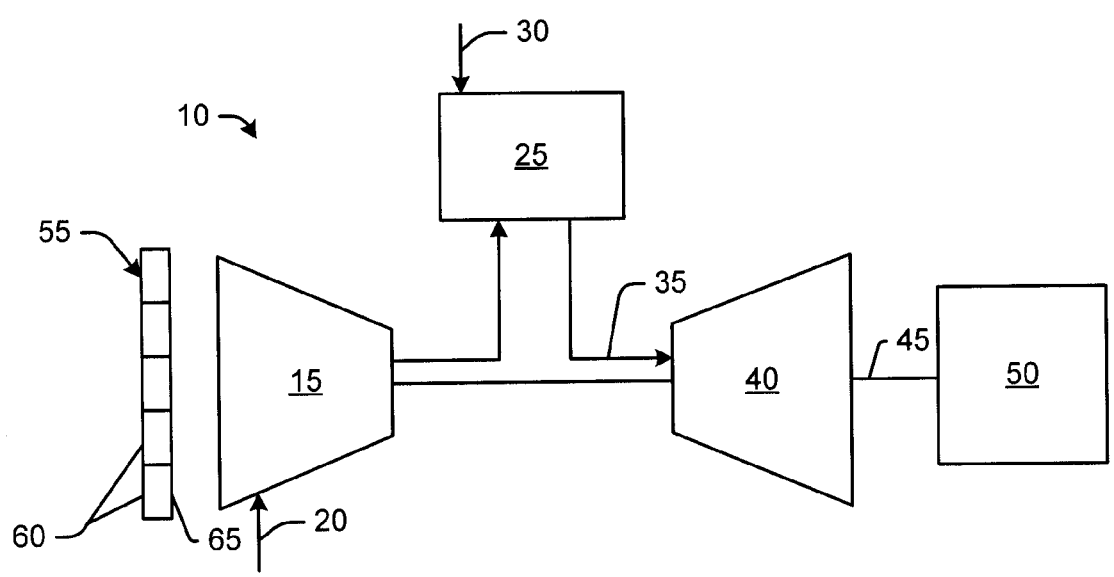
FIG. 1 is a schematic diagram of a gas turbine engine with a compressor, combustor, a turbine, a shaft, and a load. An inlet air filtration system is positioned about the compressor.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels or blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 also may be used with a filtration system 55. The filtration system 55 may include any number of filtration units 60 positioned therein. The filtration system 55 may be positioned upstream of the compressor 15 so as to filter the incoming flow of air 20 with respect to particulate contaminates and/or water droplets. The filtration system 55 may be configured as a filter house or other type of structure.

In this example, the filtration units 60 may be in the form of a number of mini-pleat filters 65 and the like. As described above, such mini-pleat filters 65 may have a generally square, planar configuration. Substantially rectangular shapes also may be used. Other types of filters such as bag or pocket type filters and the like also may be used herein. The filtration units 60 may be pre-filters or final filters. The filtration units 60 may include a filter media 70 therein. The filter media 70 may be made from cellulose, blends of cellulose and polyester, glass microfiber, blends of glass microfiber and synthetic fibers, composites, and the like. Any type of filter media 70 may be used herein. Differing types of filter media also may be used herein. The filter media 70 may be in the form of a number of pleats 75. Any number of the pleats 75 may be used herein in any depth and/or angle. In order to ensure efficient operation, the pleats 75 should be positioned vertically. Such a vertical orientation allows, for example, any water captured within the pleats 75 to drain away in an efficient manner.

Figure 2:
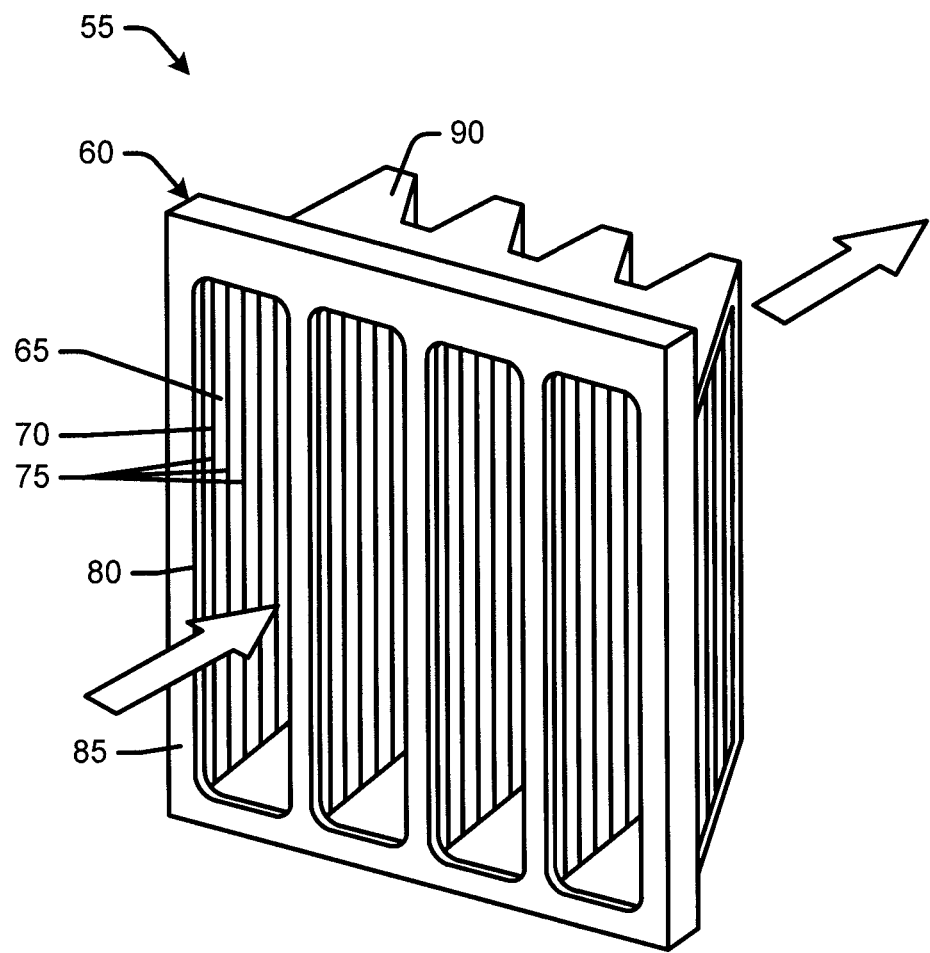
FIG. 2 is a perspective view of a filtration unit as may be used with the filtration system of FIG. 1.

As is shown in FIG. 2, the filter media 70 may be arranged in a substantially W-shaped orientation 80. The filter media 70 may be enclosed within a mounting frame 85. The mounting frame 85 may be made out of a thermoplastic or other type of substantially rigid material. The mounting frame 85 may include a pair of substantially W-shaped end caps 90. The end caps 90 may be positioned at the top and bottom of the filter material 70. The mounting frame 85 also may have a support screen (not shown) extending between the end caps 90. The support screen may support the filter media 70 therein and may help retain the filter media in a given shape. The support screen allows air to pass therethrough. The filtration unit 60 described herein is for the purpose of example only. Filtration units of many other designs and other configurations also may be used herein.

Figure 3:
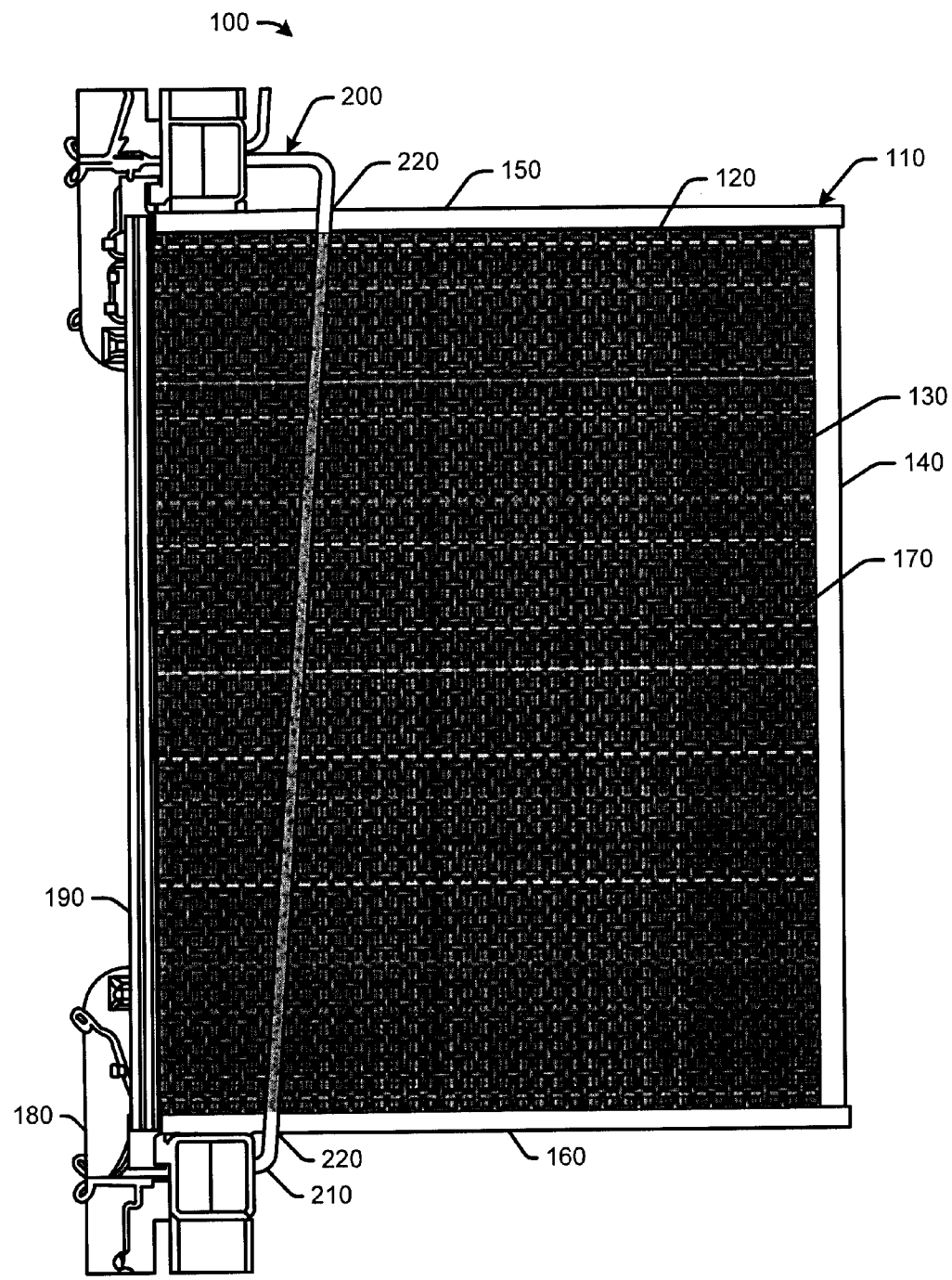
FIG. 3 is a side plan view of a filtration system with an orientation assembly as may be described herein.
Figure 4:
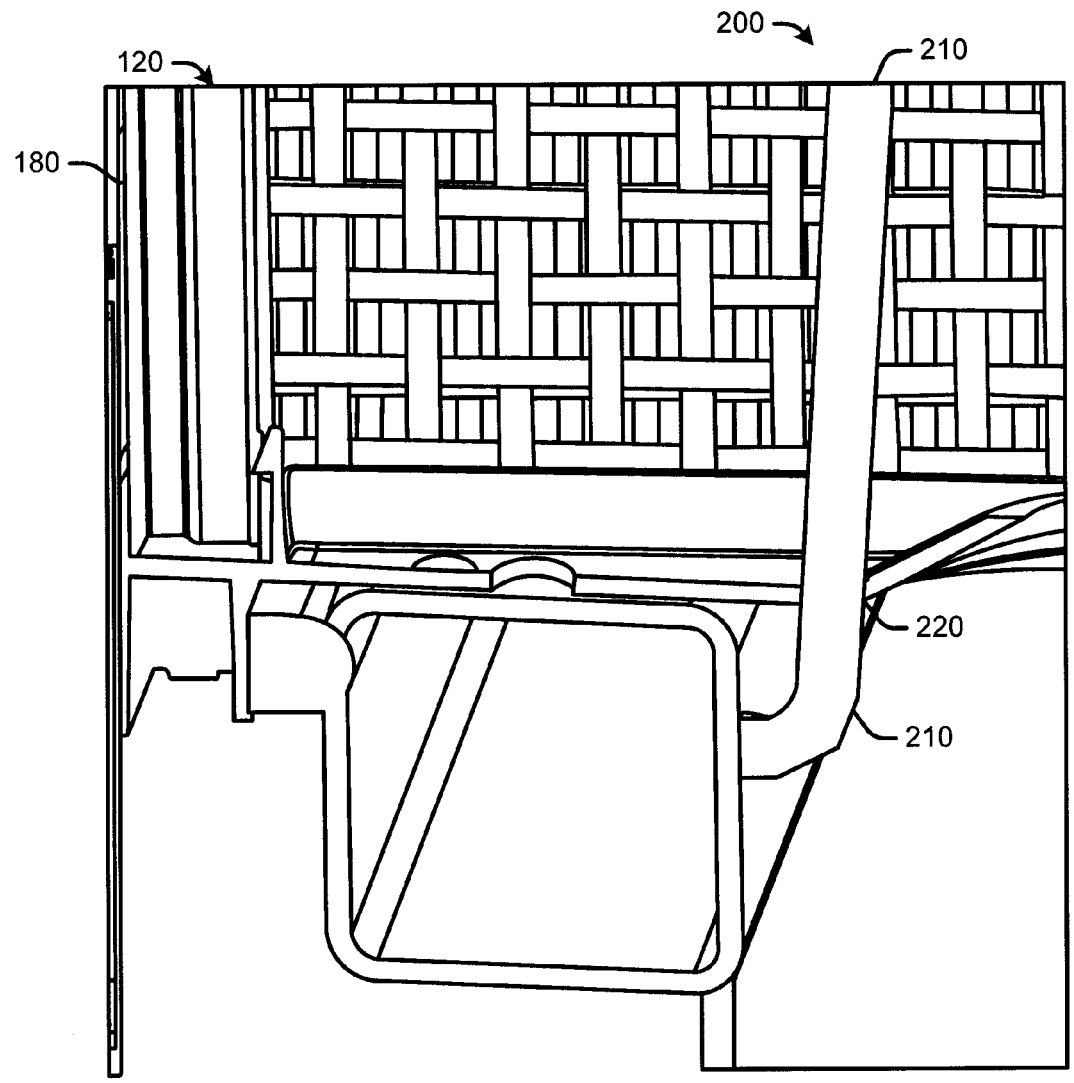
FIG. 4 is an expanded side view of the filtration system with the orientation assembly of FIG. 3.

FIG. 3 and FIG. 4 show an example of a filtration system 100 as may be described herein. Similar to that described above, the filtration system 100 may include a number of filtration units 110. The filtration units 110 may be in the form of a number of mini-pleat filters 120 similar to that described above. Other types of filters such as bag or pocket type filters and the like also may be used herein. The filters may be pre-filters or final filters. The filtration units 110 may include a filter media 130 installed within a mounting frame 140. The filter media 130 may be in the form of a number of pleats 135. The mounting frame 140 may have a pair of end caps, a first end cap 150 and a second end cap 160. The end caps 150, 160 may be identical in shape or may vary. The mounting frame 140 also may include a support screen 170 extending from the first end cap 150 to the second end cap 160 in whole or in part. The filtration units 110 and the components thereof may have any size, shape, or configuration. Other types of filtering devices also may be used herein.

A number of the filtration units 110 may be installed within a holding frame 180. The holding frame 180 may define a holding frame aperture 190 therein. The holding frame aperture 190 may be sized for the filtration units 110 to be installed therein. As described above, the filtration units 110 and the holding frame aperture 190 both may have a substantially square or rectangular shape and may be sized according to industry standards. The distance from each end cap 150, 160 to the holding frame 180 may vary.

The filtration system 100 also may include an orientation assembly 200 so as to align properly the filtration units 110 and the holding frame 180. The orientation assembly 200 may include a positioning rod 210. The positioning rod 210 may be attached to or about the holding frame 180. The positioning rod 210 may have a somewhat angled configuration in the vertical direction. A substantially vertical configuration or any angle also may be used. The positioning rod 210 may be substantially round, square, oval, T-shaped, and the like. The positioning rod 210 may have any size, shape, or configuration. The positioning rod 210 may be an element with any shape compatible with the filtration unit 110.

The orientation assembly 200 also may include one or more positioning slots 220 positioned within or about one or more of the end caps 150, 160 of the filtration units 110 or elsewhere. The positioning slots 220 likewise may be substantially round, square, oval, T-shaped, and the like. The positioning slots 220 may have any size, shape, or configuration that is compatible with the positioning rod 210 or other type of positioning element. The positioning rod 210 and the positioning slots 220 need not share the same shape, the positioning slots 220 merely need be sized and positioned to accommodate the positioning rod 210 therein when the filtration units 110 is installed within the holding frame 180. Other components and other configurations may be used herein.

In use, the filtration units 110 may be installed within the holding frame 180 via the orientation assembly 200. The orientation assembly 200 ensures that the filtration units 110 are installed in the correct orientation with the pleats 135 of the filter media 130 positioned in the substantially vertical orientation. The positioning rod 210 may be centrally positioned behind the filtration units 110 with the positioning rod 210 aligning with the positioning slots 220 in the end caps 150, 160 or elsewhere. The positioning rod 210 need only be located behind the end cap depression, not necessarily behind the entire filtration unit 110. Specifically, the positioning rod 210 should be located between any "V" or a pocket in the filtration unit 110, centrally or not. The positioning rod 210 preferably should be mounted behind at least one (1) filter per holding frame 180 although more than one may be used. Moreover, the positioning rod 210 ensures that the filtration units 110 are installed centrally within the holding frame 180 so as to provide a generally gasket-like seal therebetween for efficient operation. Moreover, the positioning slots 220 may be positioned such that only authorized filtration units 110 may be used with the positioning rod 210.

The orientation assembly 200 thus ensures the correct orientation of the filtration units 110 within the holding frame 180 while providing good sealing therein. Moreover, the orientation assembly 200 allows that only authorized filters 120 may be used herein to ensure correct and efficient operation. The orientation assembly 200 may be original equipment and/or replacement equipment. Other components and other configurations may be used herein.

Figure 5A:
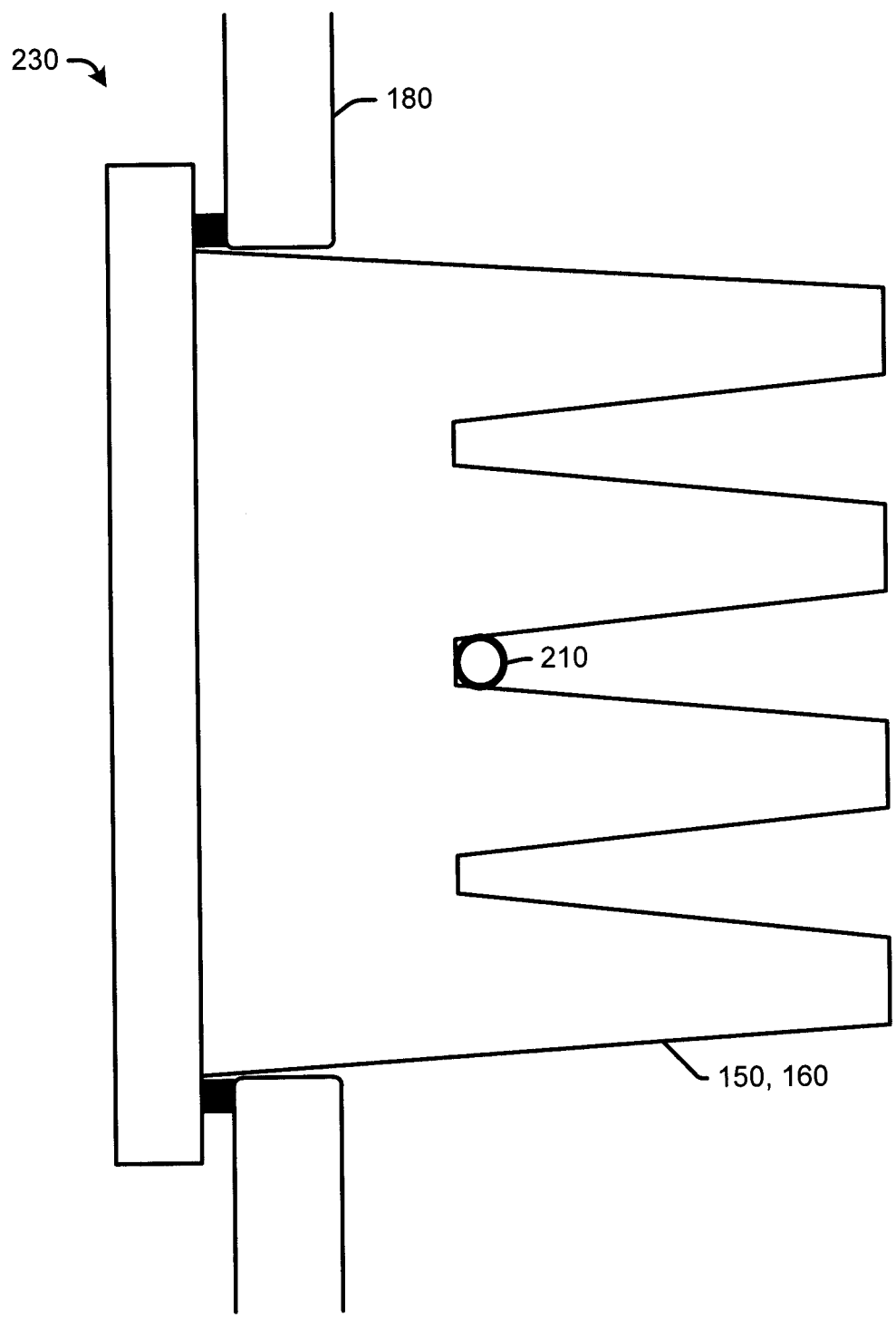
FIG. 5A is a top plan view of an alternative embodiment of an orientation assembly as may be described herein.
Figure 5B:
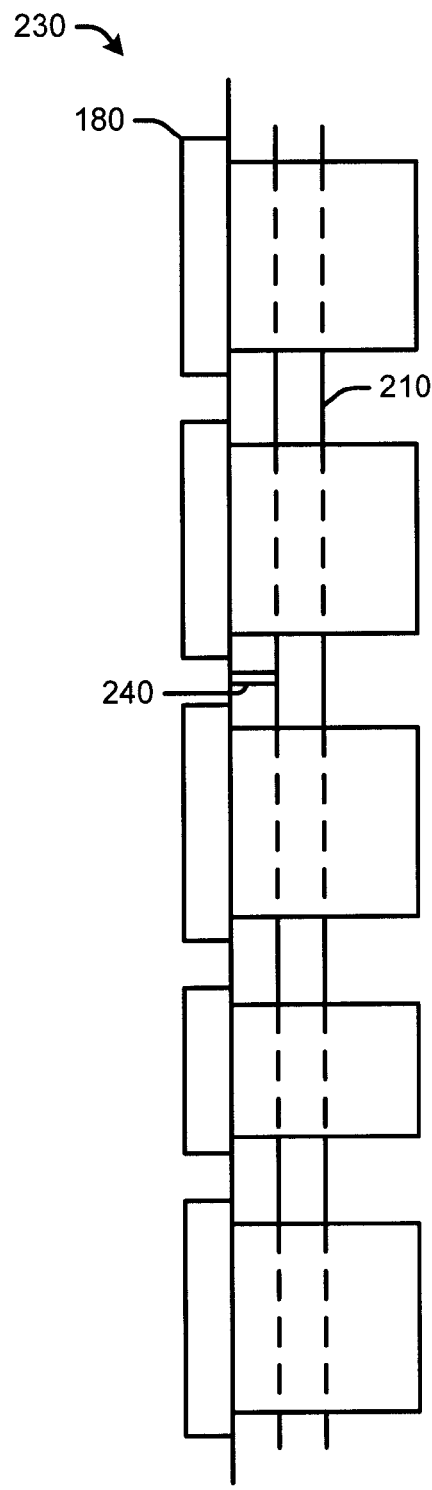
FIG. 5B is a side plan view of the orientation assembly of FIG. 5A.
Figure 6:
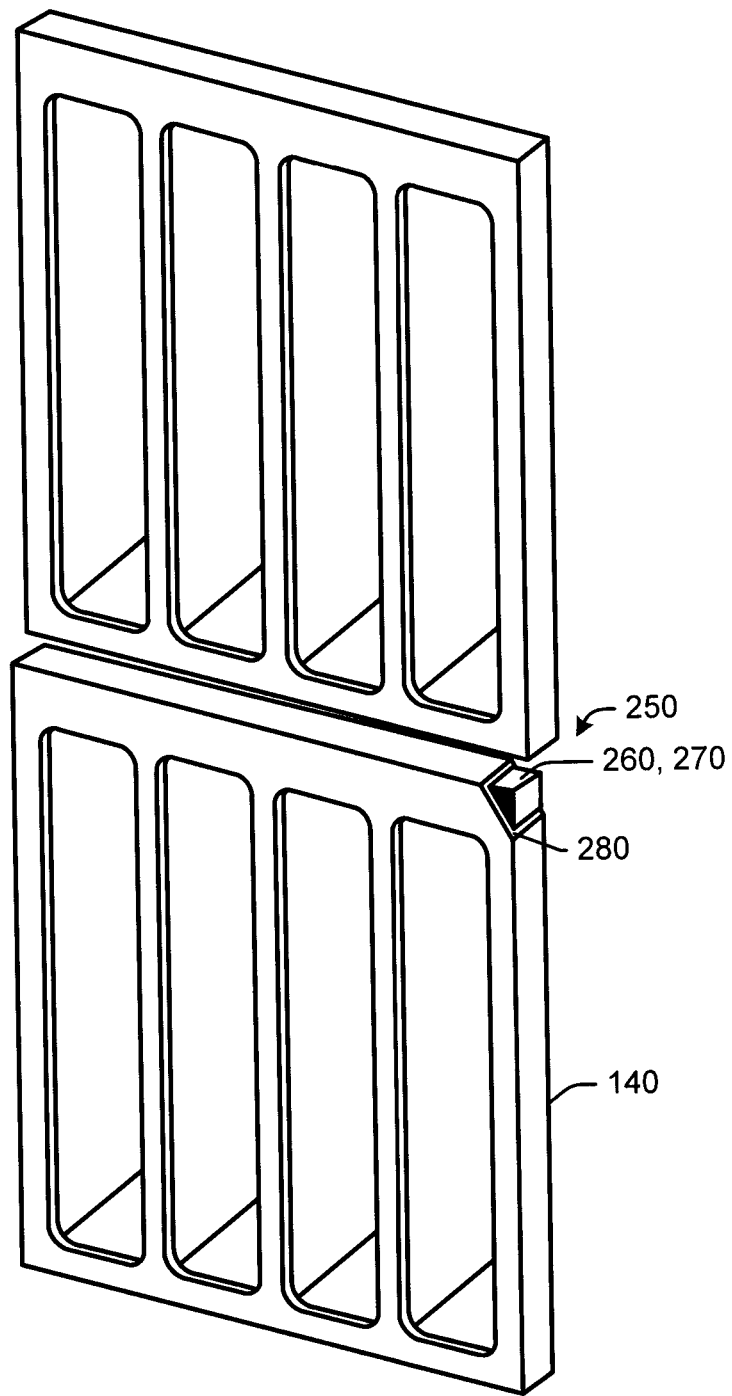
FIG. 6 is a perspective view of an alternative embodiment of an orientation assembly as may be described herein.

FIGS. 5A and 5B show an alternative embodiment of an orientation assembly 230 as may be described herein. In this example, the positioning rod 210 may be attached to the holding frame 180 via a rod support 240. The rod support 240 may have any size, shape, or orientation. The positioning rod 210 may have as substantially vertical orientation. The positioning rod 210 likewise may be attached to the inlet house or to any other adjacent structure. FIG. 6 shows a further alternative embodiment of an orientation assembly 250 as may be described herein. In this example, a positioning protrusion 260 may be used. The positioning protrusion 260 is shown as having a substantially triangular shape 270 although any size, shape, or configuration may be used. The positioning protrusion 260 may be an element with any shape compatible with the filtration unit 110. The positioning protrusion 260 may be attached to the holding frame 180 or elsewhere. The orientation assembly 250 further may include a positioning depression 280. The positioning depression 280 may be attached to the mounting frame 140, the end caps 150, 160 or elsewhere. The positioning depression 280 likewise may have a substantially triangular shape although any compatible size, shape, or configuration may be used. Other components and other configurations may be used herein.

Figure 7:
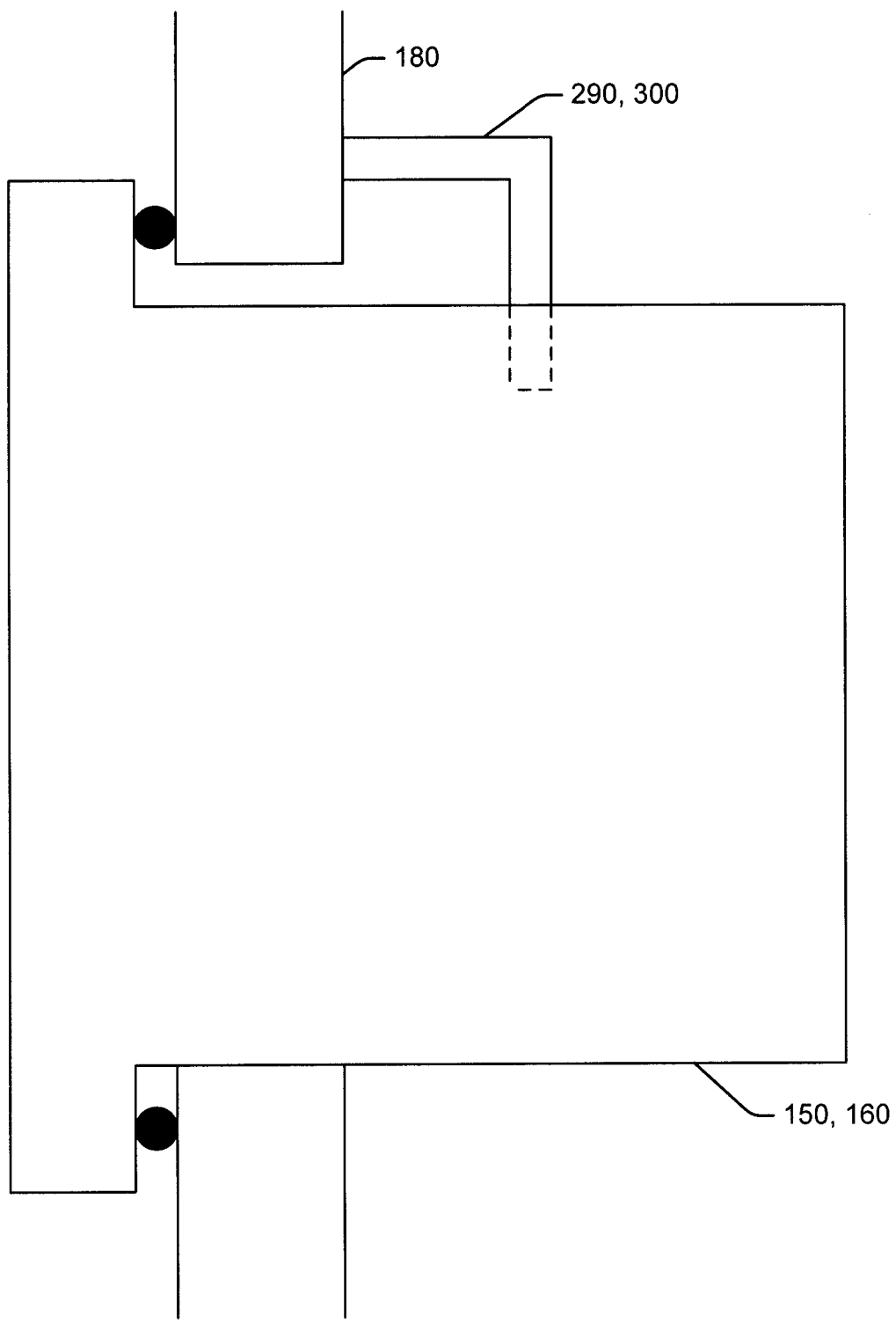
FIG. 7 is a top plan view of an alternative embodiment of a positioning rod as may be described herein.

FIG. 7 shows a further embodiment of a positioning rod 290. In this example, the positioning rod may have a substantial "L" like shape 300. The positioning rod 290 may interact with the filtration unit 110 behind the depression of one of the end caps 150, 160 or elsewhere. The positioning rod 290 may have any size, shape, or configuration. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A filtration system for a gas turbine engine, comprising:
   a holding frame;
   the holding frame comprising a positioning element extending therefrom; and
   a filtration unit for mounting within the holding frame;
   the filtration unit comprising an end cap;
   the end cap comprising a positioning slot therein such that the positioning element extends through the positioning slot when the filtration unit is mounted within the holding frame; and
   wherein the filtration unit comprises a substantially square or rectangular shape.

2. The filtration system of claim 1, wherein the positioning element comprises a positioning rod.

3. The filtration system of claim 1, wherein the positioning element comprises a positioning protrusion.

4. The filtration system of claim 1, wherein the filtration unit comprises a mini-pleat filter with a plurality of pleats therein or a bag filter with a plurality of pockets therein.

5. The filtration system of claim 1, wherein the filtration unit comprises a mounting frame.

6. The filtration system of claim 1, wherein the filtration unit comprises a support screen.

7. The filtration system of claim 1, wherein the holding frame comprises a holding frame aperture sized for the filtration unit.

8. The filtration system of claim 1, wherein the positioning element comprises a straight or an angled configuration along the filtration unit.

9. The filtration system of claim 1, wherein the positioning element centers the filtration unit within the holding frame.

10. A filtration system for a gas turbine engine, comprising:
    a holding frame;
    the holding frame comprising a positioning element extending therefrom; and
    a filtration unit for mounting within the holding frame;
    the filtration unit comprising a positioning slot therein such that the positioning element extends through the positioning slot when the filtration unit is mounted within the holding frame; and
    wherein the filtration unit comprises an end cap, the positioning slot is positioned about the end cap, and the end cap comprises a substantial W-shaped orientation.

11. A filtration system for a gas turbine engine, comprising:
    a holding frame;
    the holding frame comprising a positioning rod extending therefrom; and
    a square filter for mounting within the holding frame;
    the square filter comprising an end cap;
    the end cap comprising a positioning slot therein such that the positioning rod extends through the positioning slot when the square filter is mounted within the holding frame.

12. The filtration system of claim 11, wherein the square filter comprises a mini-pleat filter with a plurality of pleats therein or a bag filter with a plurality of pockets therein.

13. The filtration system of claim 11, wherein the square filter comprises a mounting frame.

14. The filtration system of claim 11, wherein the square filter comprises a pair of end caps.

15. The filtration system of claim 11, wherein the end cap comprises a substantial W-shaped orientation.

\* \* \* \* \*